United States Patent Office 3,331,824
Patented July 18, 1967

3,331,824
POLYMERIZATION CATALYST RESIDUE
REMOVAL BY HYDROGENATION
Paul D. Folzenlogen and Marvin B. Edwards, Longview, Tex., assignors to Eastman Kodak Company, Rochester, N.Y., a corporation of New Jersey
No Drawing. Filed Jan. 7, 1964, Ser. No. 336,125
8 Claims. (Cl. 260—88.2)

This invention relates to homo- and copolymers substantially completely free of catalyst residues and to the process for removing these residues.

In the homo- and copolymerizations of a multitudinous variety of materials containing either

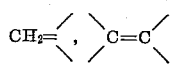

or

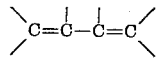

types of unsaturation such as the olefinic, and diene monomers, many types of ionic catalysts are employed. One form of such catalysts is the organometallic-transition metal halide systems such as $Al(C_2H_5)_3$—$TiCl_3$. Another is the $LiAlH_4$—$TiCl_3$—$NaF$ system. These may be termed the stereo-specific variety. Other forms of ionic catalyst comprise, for example, $AlCl_3$ or $FeCl_3$, which generally give the random or atactic polymer.

These ionic catalysts comprise what is thought to be charged or ionic complexes which attach to the monomer to promote chain growth and which remain attached to the chain ends after polymerization is complete. Where these catalyst residues are allowed to remain in the polymer, one or more of several adverse effects usually are noticed. For example, thermal stability of the polymer diminishes, probably due to progressive splitting out of monomer adjacent to the heat-excited catalyst residue. Moreover, actinic energy may cause separation of the catalyst residue from the polymer, thus allowing the residue or active sites on the polymer to react with oxygen to form colored compounds, or to allow rearrangement of the polymer segments. Although the precise mechanism by which the catalyst residues induce polymer degradation impart undesirable color thereto and so forth, is not well understood, the results are quite noticeable. It is noted that only minute quantities of such residues are necessary to give these adverse results. For example, where crystalline polystyrene was prepared with the

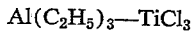

catalyst, and the catalyst residues were repeatedly leached out with alcohol and acetone, the remaining minute amounts of these residue definitely hindered the proper development of the crystalline structure and markedly affected the strength characteristics of the polymer. It is thought that in this instance the relatively large catalyst residues terminating the chains prevented the close molecular packing necessary for maximum crystal development.

Although this problem of catalyst removal has achieved considerable notoriety, the proposed solutions heretofore evolved have not been proven satisfactory for the purification of polyolefins, particularly the homo- and copolymers of ethylene, propylene, butene-1, and the like. These prior methods include contacting the polyolefin repeatedly with isobutanol at reflux temperature or under pressure at 150° C., adsorption on activated carbon, and adsorption on activated clays. With the latter method some quality improvement was possible but only if the clay-to-polymer dosage was extremely high—several times the maximum commercially feasible dosage. Even when equal weights of adsorbent (Super Filtrol or Attapulgus clay, for example) and amorphous polypropylene were used, quality improvement fell far short of that desired.

Objects of the present invention, therefore, are: to provide polymers, particularly polyolefins and copolymers of olefins and other ethylenically unsaturated materials such as dienes and vinyl monomers such as styrene, vinyl chloride, and the acrylates and methacrylates which are essentially free of catalyst residues; and to provide a commercially practicable process for carrying out this purification.

These and other objects hereinafter becoming apparent have been achieved in accordance with the present invention through the discovery that the ionic catalysts can be separated from the polymer chains by contacting the polymer with hydrogen in the presence of a hydrogenation catalyst. Moreover, this hydrogenation converts the catalyst residues to insoluble compounds which are readily filterable from the polymer solution, dope, or melt. For example, a sodium metal promoter used in polyethylene production was catalytically hydrogenated to sodium hydride and readily filtered from the polymer. In this process it is thought that hydrogenation of the bond between the catalyst complex and the polymer occurs. This removal of the active catalyst site from the polymer thus increases its color, thermal, light, and oxidative stability, reduces the formation of carbonyl groups, and improves the odor of the polymer.

In connection with working out the present process, blank runs were made in which amorphous polypropylene was contacted with hydrogen in the absence of catalyst, and with catalyst in the absence of hydrogen. These runs showed that both hydrogen and catalyst were necessary. The process has been applied successfully to both crystalline and amorphous homo- and copolymers. The hydrogenation step can be carried out using either a fixed bed of catalyst or a catalyst slurry.

*Fixed bed process in general.*—The liquid level in the fixed bed can be held at any level. The polymer can be hydrogenated in the molten state or dissolved in an inert solvent to reduce the viscosity of the polymer and, therefore, improve the contact with the catalyst. If the polymer is made by solution polymerization, it is advantageous to use the polymerization solvent for the dilution solvent in the hydrogenation process. This will make it possible to upgrade both the crude polymer and the accompanying solvent in a single step. The solvents used should preferably be free of color and any other contaminants such as sulfur or other catalyst poisons harmful to the process. Some suitable solvents include: the aliphatic hydrocarbons or mixtures thereof, such as hexane, heptane, or mineral spirits. Contact times ranging from 15 seconds to 24 hours can be used, preferably from 3 to 30 minutes. The hydrogenated effluent from the fixed bed is filtered to remove the catalyst residues and then the polymer is concentrated. Typical hydrogenation catalysts such as supported nickel or the noble metals can be used. Catalysts used successfully include nickel on kieselguhr (Girdler G-49B and Harshaw's Ni-0104), barium promoted copper chromite (Harshaw's 1107), and palladium on alumina (Girdler's G-55). Pressures ranging from atmospheric to 10,000 p.s.i.g., preferably from 200 to 600 p.s.i.g., can be used. Any temperature suitable for keeping the polymer in solution can be employed. Temperatures between 150 and 200° C. are preferred.

*Slurry process in general.*—The slurry process can be operated using the same temperature, pressures, solvents, and contact times as are suitable for the fixed bed process and may be operated either batchwise or continuously. The batch process can be carried out in an autoclave using a suitable method of agitation such as a mixer or a circulating pump or both. After a sufficient contact time, the polymer or polymer solution is filtered or centrifuged to remove the catalyst. Suitable filters such as pressure leaf or plate and frame filters can be used. The continuous slurry process can be operated in any suitable autoclave or reactor, such as a tubular reactor. The catalyst and polymer or polymer solution is continuously fed to and drawn out of the reactor. The reactor effluent is filtered or centrifuged as in the batch process and the catalyst is either discarded or recovered and returned to the reactor.

The invention is further explained in the following examples which serve to illustrate several preferred methods of operation.

EXAMPLE 1

*Fixed bed*

A fixed bed 3 feet tall by 1½ inches in diameter packed with Girdler G–49B pelletized (3/16 inch x ⅛ inch) catalyst (approximately 50% nickel on kieselguhr) was used. A solution of 30% amorphous polypropylene (polymer as obtained from the hexane extraction of polypropylene made by solution polymerization of propylene using TiCl$_3$—LiAlH$_4$ catalyst) and 70% mineral spirits was hydrogenated at 200–225 p.s.i.g. and 177° C. The amorphous had a melt viscosity of 12,000 cps. at 150° C. and an inherent viscosity of 0.34 at 145° C. The solution was fed into the top of the bed and the bed was operated one-half full. A contact time of 20 minutes was used. Samples from the fixed bed were filtered and concentrated to determine the effectiveness of the hydrogenation process. The amorphous polypropylene feed had a Gardner color of 5 and the hydrogenated polymer had a color of 1. The amorphous polypropylene had an ash content of 0.016% before hydrogenation and 0.004% after hydrogenation.

Further examples of fixed bed runs are listed in Table I.

TABLE I.—FIXED BED HYDROGENATION OF POLYMERS

[Conditions: Mineral spirits solvent catalyst—50% nickel on kieselguhr]

| Example | Polymer | Temp., ° C. | Press., p.s.i.g. | Contact Time, Hrs. | Percent Polymer in Solution | Gardner Color | | Percent Ash | |
|---|---|---|---|---|---|---|---|---|---|
| | | | | | | Before | After | Before | After |
| 2 | Amorphous Polypropylene | 180 | 400 | 0.86 | 33.7 | 15 | 1 | 0.097 | .001 |
| 3 | do | 180 | 600 | 0.50 | 31.4 | 15 | 1 | 0.097 | .001 |
| 4 | do | 180 | 400 | 0.76 | 31.0 | 15 | 1 | 0.097 | .001 |
| 5 | do | 180 | 600 | 0.07 | 30.0 | 15 | 1 | 0.097 | .001 |
| 6 | do | 180 | 600 | 0.09 | 55.7 | 15 | 1 | 0.097 | .001 |

In the above examples, the polypropylene had a melt viscosity of 12,000 cps. at 150° C. as measured by Brookfield Viscosimeter.

EXAMPLE 7

*Slurry Process*

A solution containing 25% amorphous polypropylene (as defined in Example 1) and 75% mineral spirits was hydrogenated in a 1-liter stirred Parr autoclave at 150–200° C. and 200 p.s.i.g. The polymer had a melt viscosity of 91,800 cps. at 150° C. A contact time of two hours was used. The autoclave was charged with 100 g. of amorphous polypropylene, 375 ml. of mineral spirits, and 2 g. of powdered catalyst (50% nickel on kieselguhr). After the solution was hydrogenated it was filtered and the polymer concentrated. The amorphous polypropylene feed had a Gardner color of 3 and an ash content of 0.017%. After hydrogenation the color was reduced to less than 1 on the Gardner scale and the ash content was lowered to 0.007%. The hydrogenated polymer was found to be more stable than the non-hydrogenated polymer. After 26 hours at 190° C. in the presence of air, the viscosity of the hydrogenated polymer dropped 30% while the non-hydrogenated polymer experienced a 50% drop.

Examples 8–11 are given in Table II.

TABLE II.—HYDROGENATION OF POLYMERS USING A SLURRY PROCESS

| | Example Number | | | |
|---|---|---|---|---|
| | 8 | 9 | 10 | 11 |
| | Polymer Type | | | |
| | Amorphous Polypropylene | Amorphous Polypropylene | EPR | EPR |
| Polymer Viscosity, cps. at 150° C | 9,000 | 115,000 | | 20. |
| Weight of Polymer Charged, g | 100 | 400 | 40 | |
| Solvent | Mineral Spirits | Mineral Spirits | Mineral Spirits | Mineral Spirits. |
| Polymer Concentration, percent | 25 | 25 | 5 | 5. |
| Catalyst | Girdler G–49B | Girdler G–49B | Girdler G–49B | Girdler G–49B. |
| Catalyst Concentration, percent | 2 | 1 | 10 | 5. |
| Temperature, ° C | 150–180 | 180 | 175 | 200. |
| Pressure, p.s.i.g | 200 | 200 | 175 | 200. |
| Contact Time, Hrs | 4 | 12 | 4 | 4. |
| Polymer Color, Gardner Scale: | | | | |
| Before | >18 | 5 | >18 | >18. |
| After | 1 | 1 | 1 | 1. |
| Polymer Ash Content, percent: | | | | |
| Before | 0.097 | 0.020 | 0.086 | 0.086. |
| After | 0.001 | 0.004 | 0.062 | 0.004 |

In Table II, EPR designates an ethylene-propylene copolymer rubber (MD460 of Enjay Chemical Co.). Also, in Examples 10 and 11, the polymer color before hydrogenation was dark greenish yellow, due to high vanadium content.

EXAMPLE 12

Using the slurry process described in Example 7, several polymer samples were hydrogenated. The starting polymer was obtained by hexane extraction of gross polymer samples prepared by a two-stage process in which the propylene is contacted with a solid stereospecific catalyst in the first stage and then, in the second stage, the other monomer is added to give the copolymer. In each case, the hexane-soluble fraction was hydrogenated as a 20% solution in mineral spirits using 2% nickel on keiselguhr catalyst comprising about 50% nickel. Details of the experiments are given in Table III.

TABLE III.—HYDROGENATION OF HEXANE-SOLUBLE FRACTION

| | Example | | | | | |
|---|---|---|---|---|---|---|
| | 12 | 13 | 14 | 15 | 16 | 17 |
| Parent Polymer: | | | | | | |
| Major Component | Propylene | Propylene | Propylene | Propylene | Propylene | Propylene |
| Minor Component | Ethylene | Butene-1 | TMB | Isoprene | Styrene | Vinyl Chloride |
| Percent Minor Component | 3 | 4 | 2 | 1 | 1 | 1 |
| Temperature, °C | 175 | 175 | 200 | 200 | 200 | 200 |
| Pressure, p.s.i.g | 600 | 600 | 600 | 600 | 600 | 600 |
| Contact Time, Hrs | 4 | 4 | 4 | 4 | 6 | 6 |
| Polymer Color, Gardner Scale: | | | | | | |
| Before | 18 | 15 | 15 | 18 | >18 | >18 |
| After | <1 | 1 | <1 | <1 | 1 | 1 |
| Polymer Ash Content, percent: | | | | | | |
| Before | 0.065 | 0.074 | 0.072 | 0.046 | 0.091 | 0.109 |
| After | 0.002 | 0.001 | 0.002 | 0.001 | 0.011 | 0.004 |

In the above table, TMB designates 1,1,4,4-tetramethyl-1.3-butadiene.

The invention has been described in detail with particular reference to preferred embodiments thereof but it will be understood that variations and modifications can be effected within the spirit and scope of the invention as described hereinabove and as defined in the appended claims.

We claim:
1. In the polymerization of polymer or copolymer compositions derived from monomer reactants containing only one

$$>C=C<$$

group and wherein said monomers are polymerized in the presence of an ionic catalyst to form a polymeric reaction product with said ionic polymerization catalyst internally occluded in the product, the improvement comprising contacting said polymeric reaction product with hydrogen in the presence of a hydrogenation catalyst for a time sufficient to hydrogenate substantially all of the occluded catalyst whereby the ionic catalyst can be easily separated by filtration from the polymer or copolymer compositions.

2. The process as defined in claim 1 wherein the hydrogenation catalyst is selected from the group consisting of nickel on kieselguhr, barium promoted copper chromite, and palladium on alumina.

3. The process as defined in claim 1 wherein said composition is a copolymer composition prepared from at least one α-olefin and at least one other mono-olefin material, said copolymer being soluble in boiling hexane.

4. The process as defined in claim 1 wherein the polymeric composition is selected from the group consisting of homo- and copolymers of ethylene, propylene, butene-1, isobutylene, and hexene-1.

5. A process for treating a polymeric reaction product prepared by reacting monomers containing only one $$>C=C<$$

group in the presence of ionic polymerization catalysts selected from the group consisting of metals, organometallic compounds, metal halides, and hydrides of elements from Groups 1A to 3A of the Periodic Table in combination with compounds of transition elements from Groups 4B through 6B of the Periodic Table wherein said polymeric reaction product contains said ionic polymerization catalyst internally dispersed therein, comprising forming a solution of said polymeric reaction product in an inert solvent, contacting said solution with hydrogen in the presence of a hydrogenation catalyst to separate said ionic polymerization catalyst from said composition and render it filterable therefrom.

6. The process of claim 5 including the step of filtering the hydrogenated polymeric reaction product to remove substantially all of the ionic polymerization catalyst.

7. In the polymerization of polymer or copolymer compositions by reacting monomers containing only one $$>C=C<$$

group in the presence of ionic polymerization catalysts selected from the group consisting of metals, organometallic compounds, metal halides, and hydrides of elements from Groups 1 to 3 of the Periodic Table in combination with compounds of transition elements from Groups 4 through 6 of the Periodic Table wherein a reaction mixture is obtained comprising polymeric product with an internally occluded polymerization catalyst, the improvement comprising removing the ionic polymerization catalyst by contacting said polymeric product with hydrogen in the presence of a hydrogenation catalyst and filtering the polymer product to remove the catalyst residue.

8. In the polymerization of polymer or copolymer compositions by reacting monomers containing only one $$>C=C<$$

group in the presence of ionic polymerization catalysts selected from the group consisting of metals, organometallic compounds, metal halides, and hydrides of elements from Groups 1 to 3 of the Periodic Table in combination with compounds of transition elements from Groups 4 through 6 of the Periodic Table wherein a reaction mixture is obtained comprising polymeric product with internally retained ionic polymerization catalyst, the improvement comprising contacting said polymeric product with hydrogen in the presence of a hydrogenation catalyst to separate said ionic polymerization catalyst from said composition and render it filterable therefrom.

References Cited

UNITED STATES PATENTS

| 2,997,453 | 8/1961 | Short | 260—94.7 |
| 3,023,201 | 2/1962 | Moberly | 260—94.7 |
| 3,053,821 | 9/1962 | Rees | 260—96 |
| 3,138,579 | 6/1964 | Cabaness | 260—94.9 |
| 3,149,097 | 9/1964 | Coover | 260—93.7 |
| 3,220,996 | 11/1965 | Hull et al. | 260—93.7 |

JOSEPH L. SCHOFER, *Primary Examiner.*

M. B. KURTZMAN, *Assistant Examiner.*